United States Patent
Douglass et al.

(10) Patent No.: US 10,237,239 B2
(45) Date of Patent: Mar. 19, 2019

(54) POLICY-BASED LOAD DISTRIBUTION BETWEEN HOST-BASED PACKET PROCESSING UNITS

(71) Applicant: International Business Machines Corporation, Armonk, NY (US)

(72) Inventors: Jeffrey L. Douglass, Fremont, CA (US); Cheng-Ta Lee, Taipei (TW); James B. Peterson, Atlanta, GA (US); Deepti Sachdev, Cumming, GA (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 14/957,918

(22) Filed: Dec. 3, 2015

(65) Prior Publication Data

US 2017/0163602 A1 Jun. 8, 2017

(51) Int. Cl.
*G06F 9/455* (2018.01)
*H04L 29/06* (2006.01)
*H04L 12/741* (2013.01)
*H04L 12/803* (2013.01)
*H04L 12/851* (2013.01)
*H04L 12/931* (2013.01)

(52) U.S. Cl.
CPC ...... *H04L 63/0227* (2013.01); *G06F 9/45533* (2013.01); *H04L 45/74* (2013.01); *H04L 47/125* (2013.01); *H04L 47/24* (2013.01); *H04L 49/70* (2013.01); *G06F 2009/45595* (2013.01)

(58) Field of Classification Search
CPC .................................................. H04L 47/125
See application file for complete search history.

(56) References Cited

U.S. PATENT DOCUMENTS

| | | | |
|---|---|---|---|
| 8,054,744 B1 * | 11/2011 | Bishara | H04L 47/2441 370/229 |
| 2009/0073895 A1 | 3/2009 | Morgan et al. | |
| 2012/0185856 A1 * | 7/2012 | Ashihara | G06F 9/4856 718/1 |
| 2013/0047151 A1 * | 2/2013 | Sridharan | G06F 9/45558 718/1 |
| 2013/0058229 A1 * | 3/2013 | Casado | H04L 45/745 370/252 |
| 2013/0311428 A1 * | 11/2013 | Patel | G06F 17/30312 707/634 |
| 2014/0115578 A1 * | 4/2014 | Cooper | G06F 21/606 718/1 |
| 2014/0126367 A1 * | 5/2014 | Stark | H04L 43/0852 370/235 |

(Continued)

*Primary Examiner* — Madhuri R Herzog
(74) *Attorney, Agent, or Firm* — Stephen R. Tkacs; Stephen J. Walder, Jr.; Jeffrey S. LaBaw (57) ABSTRACT

A mechanism is provided in a network security subsystem in a virtual machine monitor for policy based load distribution among a plurality of packet processing units. Responsive to receiving a packet from a virtual machine, the network security subsystem compares the packet to rules in a load distribution policy in the network security subsystem. Responsive to the packet matching a rule in the load distribution policy, the network security subsystem identifies a packet processing unit list and an action in the matching rule. The network security subsystem distributes the packet to a selected packet processing unit from the packet processing unit list based on the action.

14 Claims, 5 Drawing Sheets

| RULE # | VM GROUP ID | PPU LIST | ACTION |
|---|---|---|---|
| 1 | 1 | [1, 2] | SEND PACKET TO PPU IN ROUND-ROBIN ORDER |
| 2 | 2 | [1, 3] | SEND PACKET TO PPU IN ROUND-ROBIN ORDER |
| 3 | 3 | [2] | SEND PACKET TO PPU |

(56) References Cited

U.S. PATENT DOCUMENTS

| | | | |
|---|---|---|---|
| 2014/0254597 A1* | 9/2014 | Tian | H04L 29/12839 370/392 |
| 2014/0280499 A1* | 9/2014 | Basavaiah | H04L 67/1002 709/203 |
| 2014/0310389 A1 | 10/2014 | Lee et al. | |
| 2016/0212012 A1* | 7/2016 | Young | H04L 41/14 |
| 2016/0294874 A1* | 10/2016 | Sun | H04L 63/0227 |

\* cited by examiner

| RULE # | SOURCE ID | DESTINATION ID | ACTION |
|---|---|---|---|
| 1 | 10.40.1.2 | * | SEND TO VM |
| 2 | * | 10.40.1.3 | FORWARD |
| 3 | * | 10.40.1.4 | SEND TO VM |

PPU LIST:

| PPU ID | PPU NAME | SVM ID |
|---|---|---|
| 1 | PPU A | 1 |
| 2 | PPU B | 1 |
| 3 | PPU C | 2 |

FIG. 9

VM GROUP LIST

| VM GROUP ID | VM LIST |
|---|---|
| 1 | [A, B, C] |
| 2 | [D, E, F] |
| 3 | [G] |

FIG. 10A

| RULE # | VM GROUP ID | PPU LIST | ACTION |
|---|---|---|---|
| 1 | 1 | [1] | SEND PACKET TO PPU |
| 2 | 2 | [3] | SEND PACKET TO PPU |
| 3 | 3 | [2] | SEND PACKET TO PPU |

FIG. 10B

| RULE # | VM GROUP ID | PPU LIST | ACTION |
|---|---|---|---|
| 1 | 1 | [1, 2] | SEND PACKET TO PPU IN ROUND-ROBIN ORDER |
| 2 | 2 | [1, 3] | SEND PACKET TO PPU IN ROUND-ROBIN ORDER |
| 3 | 3 | [2] | SEND PACKET TO PPU |

FIG. 10C

| RULE # | SOURCE ID | DESTINATION ID | PPU LIST | ACTION |
|---|---|---|---|---|
| 1 | * | 10.40.1.4 | [1, 2, 3] | SEND PACKET TO PPU BASED ON CONNECTION |

FIG. 11

POLICY-BASED LOAD DISTRIBUTION BETWEEN HOST-BASED PACKET PROCESSING UNITS

BACKGROUND

The present application relates generally to an improved data processing apparatus and method and more specifically to mechanisms for policy-based load distribution between host-based packet processing units.

A hypervisor or virtual machine monitor (VMM) is a piece of computer software, firmware, or hardware that creates and runs virtual machines (VMs). A computer on which a VMM is running one or more virtual machines is defined as a host machine. Each virtual machine is called a guest machine. The VM presents the guest operating systems with a virtual operating platform and manages the execution of the guest operating systems. Multiple instances of a variety of operating systems may share the virtualized hardware resources.

SUMMARY

In one illustrative embodiment, a method, in a data processing system, is provided for policy based load distribution among a plurality of packet processing units. The method comprises a network security subsystem in a virtual machine monitor receiving a packet from a virtual machine and comparing the packet to rules in a load distribution policy in the network security subsystem. The method further comprises the network security subsystem identifying a packet processing unit list and an action in the matching rule. The method further comprises the network security subsystem distributing the packet to a selected packet processing unit from the packet processing unit list based on the action.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for policy based load distribution between host-based packet processing units on the virtual machine monitor. The illustrative embodiments perform load distribution using a rule-based architecture. The illustrative embodiments extend the current action set of the policy rules to include the load distribution knowledge to let the virtual machine monitor (VMM), which then distributes packets to different packet processing units (PPUs).

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
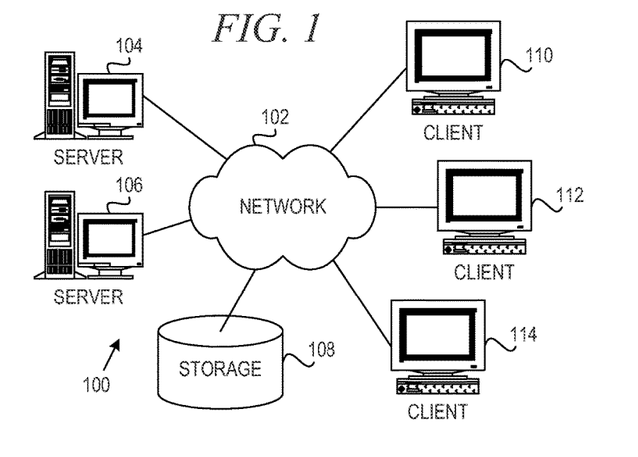
FIG. 1 is an example diagram of a distributed data processing system in which aspects of the illustrative embodiments may be implemented.
Figure 2:
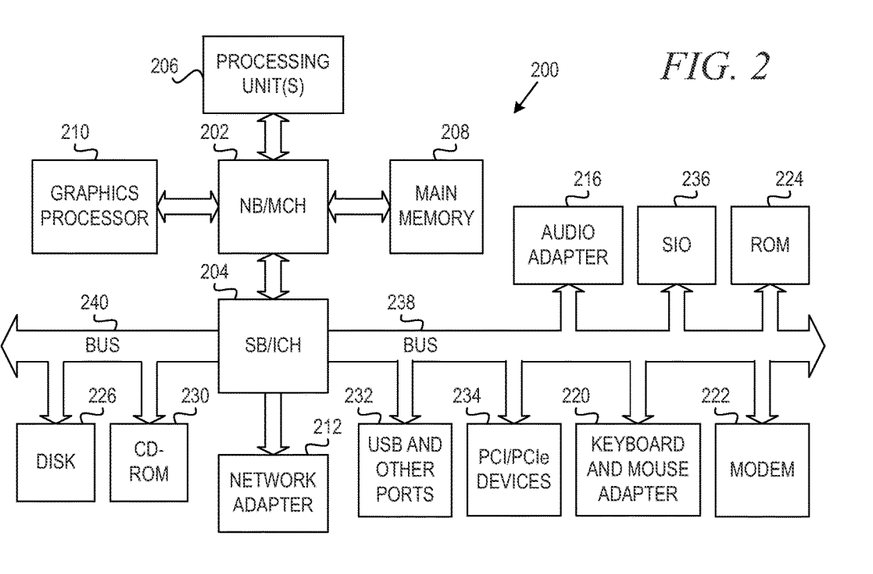
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement policy-based load distribution among host-based packet processing units. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates policy-based load distribution among host-based packet processing units.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to policy-based load distribution among host-based packet processing units.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Network traffic inspection on the virtual machine monitor (VMM) is one of the most important features that a virtualized security solution must have. Unlike traditional network traffic inspection, the security agent on the VMM must inspect the traffic from/to each virtual machine running on the VMM. One approach to packet inspection on the VMM is using host-based architecture. A security virtual machine (SVM) running on the VMM focuses on packet inspection. The VMM provides an interface to the SVM to retrieve the packets flowing into or out from each virtual machine.

The interface that the VMM provides could be in any form. For example, the SVM can access an interface opened on a virtual switch (vswitch) or a distributed vswitch for every packet flowing on the vswitches. The VMM can also intercept a packet flowing from/to the virtual network interface card (vNIC) by inserting a special hook in each vNIC and then provide an interface to the SVM to retrieve the packet from the hooks directly.

Inside the SVM, the packet processing units (PPU) running on it could retrieve the packet using the interface provided by the VMM from different types of sources. One SVM could run multiple PPUs; however, there was no good way to distribute packet between PPU in the past. The PPU may retrieve the packet using a shared memory mechanism between the VMM and the virtual machine. The PPU may also use a traditional way to get the packet form the vNICs.

Figure 3:
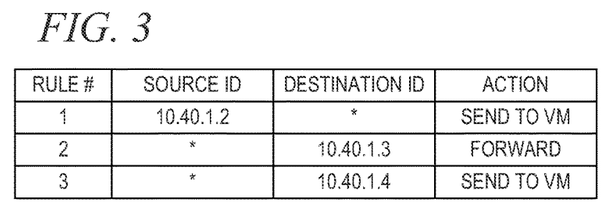
FIG. 3 depicts an example rule-based policy for inspecting packet traffic in accordance with an illustrative embodiment.

In order to send packets to the SVM from the VMM, one common implementation is to use a rule-based design. The SVM may push rules to the VMM to tell the VMM how to send packets. The rules may be vNIC-based, VM-based, and vswitch-based. This set of rules forms a rule-based policy may be in any format. FIG. 3 depicts an example rule-based policy for inspecting packet traffic in accordance with an illustrative embodiment. According to rule 1, when a packet is sent from source Internet Protocol (IP) address 10.40.1.2, the VMM sends the traffic to the SVM for inspection. According to rule 2, when a packet is sent to destination IP address 10.40.1.3, the VMM forwards the packet to the destination. According to rule 3, when a packet is sent to destination IP address 10.40.1.4, the VMM sends the packet to the SVM.

There are many different actions that can be specified in a rule, including forward, drop, network address translation (NAT), tunnel, send to the SVM, change the media access control (MAC) address, insert new content to payload, inject new packet to the connection, etc.

Figure 4:
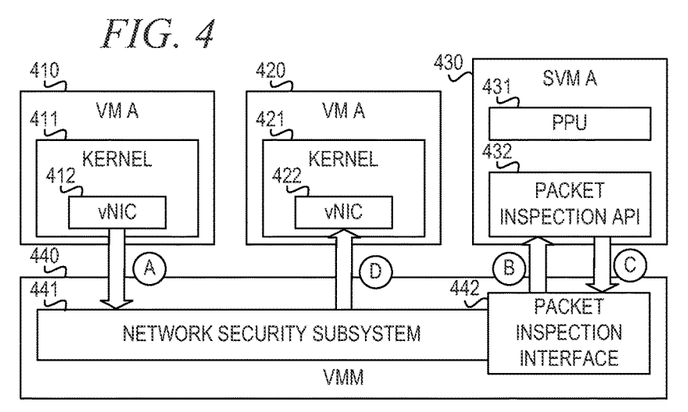
FIG. 4 is a block diagram of a data processing illustrating an example of packet flow in accordance with an illustrative embodiment.

FIG. 4 is a block diagram of a data processing illustrating an example of packet flow in accordance with an illustrative embodiment. Virtual machine monitor (VMM) 440 initiates virtual machine A 410 and virtual machine B 420. VM A 410 executes kernel 411, which includes virtual network interface card (vNIC) 412. VM B 420 executes kernel 421, which includes vNIC 422. VMM 440 also initiates security virtual machine (SVM) A 430, which includes packet processing unit (PPU) 431 and packet inspection application programming interface (API) 432. VMM 440 includes network security subsystem 441 and packet inspection interface 442.

In step A, the network security subsystem 441 intercepts the packet sending out from VM A 410. In step B, the network security subsystem 441 checks the policy in the network security subsystem 441 and decides to send the packet to SVM A 430 for inspection. Then, in step C, after inspecting the packet, SVM A 430 decides that the packet is safe and sends the packet back to the network security subsystem 441. In step D, the network security subsystem 441 sends the packet to VM B 420.

Current rule-based architectures lack the capability to perform load distribution among a plurality of packet processing units. The benefit of using multiple PPUs is to maximize the throughput on the system with multiple-core processors and to ensure there is not a single point of failure. The illustrative embodiments implement load balancing logic inside the SVM to distribute packets to different PPUs. Each PPU could run on different SVM, and there is no restriction against the number of PPUs or SVMs in the system.

Figure 5:
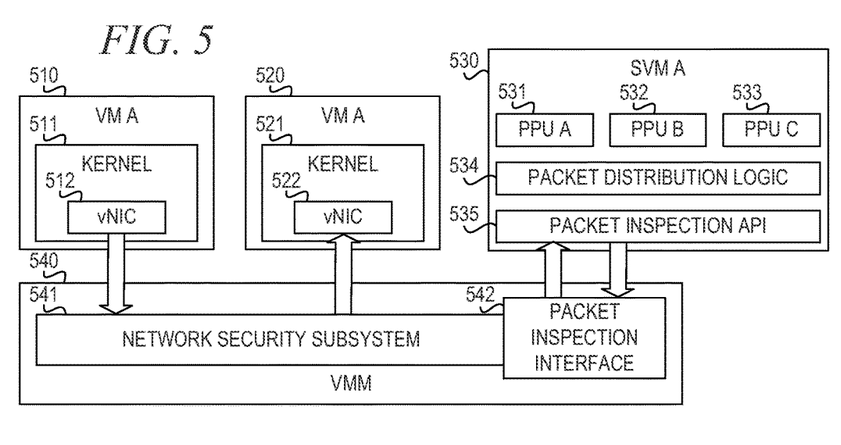
FIG. 5 is a block diagram illustrating of a data processing system with load balancing logic inside the security virtual machine in accordance with an illustrative embodiment.

FIG. 5 is a block diagram illustrating of a data processing system with load balancing logic inside the security virtual machine in accordance with an illustrative embodiment. Virtual machine monitor (VMM) 540 initiates virtual machine A 510 and virtual machine B 520. VM A 510 executes kernel 511, which includes virtual network interface card (vNIC) 512. VM B 520 executes kernel 521, which includes vNIC 522. VMM 540 also initiates security virtual machine (SVM) A 530. VMM 540 includes network security subsystem 541 and packet inspection interface 542.

In the depicted example, SVM A 530 includes multiple packet processing units: PPU A 531, PPU B 532, and PPU C 533. SVM A 530 includes packet inspection API 535 and packet distribution logic 534. There are two disadvantages to implementing load balancing logic inside the SVM:

1) the interface provided by the VMM does not support multiple PPUs, which limits the capability to distribute packets to different PPUs; and, 2) the system resources on the SVM will be wasted on the load balancing logic.

Figure 6:
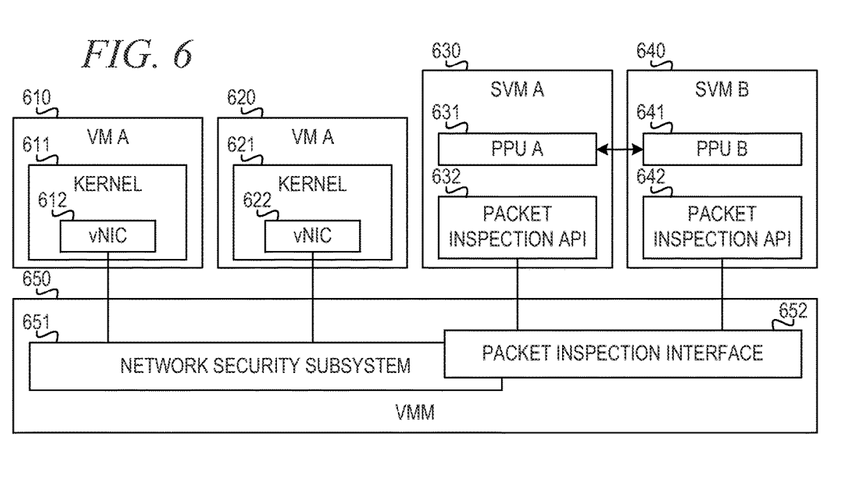
FIG. 6 is a block diagram of a data processing system with multiple safety virtual machines illustrating load distribution through cross-VM communication in accordance with an illustrative embodiment.

FIG. 6 is a block diagram of a data processing system with multiple safety virtual machines illustrating load distribution through cross-VM communication in accordance with an illustrative embodiment. Virtual machine monitor (VMM) 650 initiates virtual machine A 610 and virtual machine B 620. VM A 610 executes kernel 611, which includes virtual network interface card (vNIC) 612. VM B 620 executes kernel 621, which includes vNIC 622. VMM 650 also initiates security virtual machine (SVM) A 630 and SVM B 640. VMM 650 includes network security subsystem 651 and packet inspection interface 652.

In the depicted example, SVM A 630 includes PPU A 631 and packet inspection API 632, and SVM B 640 includes PPU B 641 and packet inspection API 642. If there are multiple SVMs involved, as in FIG. 6, the SVMs 630, 640 must setup cross-VM communication to perform load balancing correctly, because the network security subsystem cannot distinguish the different PPUs 631, 641.

The illustrative embodiments provide a mechanism to perform load distribution based on a rule-based architecture. The illustrative embodiments extend the current action set to include load distribution knowledge to allow the VMM to distribute packets to different PPUs.

Figure 7:
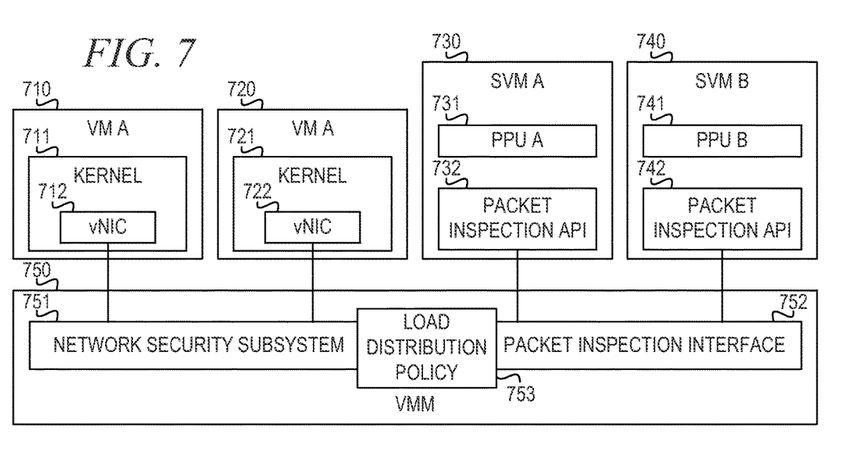
FIG. 7 is a block diagram of a data processing with rule-based load distribution among host-based packet processing units in the virtual machine monitor in accordance with an illustrative embodiment.

FIG. 7 is a block diagram of a data processing with rule-based load distribution among host-based packet processing units in the virtual machine monitor in accordance with an illustrative embodiment. Virtual machine monitor (VMM) 750 initiates virtual machine A 710 and virtual machine B 720. VM A 710 executes kernel 711, which includes virtual network interface card (vNIC) 712. VM B 720 executes kernel 721, which includes vNIC 722. VMM 750 also initiates security virtual machine (SVM) A 730 and SVM B 740. VMM 750 includes network security subsystem 751 and packet inspection interface 752.

In the depicted example, SVM A 730 includes PPU A 731 and packet inspection API 732, and SVM B 740 includes PPU B 741 and packet inspection API 742. Each PPU 731, 741 must have the capability to register to network security subsystem 751 and identify itself as an independent PPU. Network security system 751 maintains the load distribution policy 753, which includes a PPU list, a VM group list, and a set of rules. The PPU list and the VM group list can be in any structure as long as the network security subsystem 751 can identify every PPU running in the system and can specify the VM group in the rules.

Network security subsystem 751 may distribute packets to different PPUs based on the following:

1. The VM group: After defining the VM groups, network security subsystem 751 may distribute packets from a source VM group to a destination VM group. Note that one VM may define a group, and there are no special restrictions on how many VMs can form a VM group.

2. Firewall-like rules: Firewall rules use N-tuples in the packet to define the rules. Network security subsystem 751 uses the same approach to distribute packets to PPUs. In one embodiment, 5-tuples in packets represent only part of all the packet attributes. For example, the firewall rules may be based on application type to create the firewall like rule. For instance, an application may want to send HTTP traffic to PPU A, while FTP traffic goes to PPU B.

3. Connection: The static load balancer in the network security subsystem 751 may base packet distribution on the connection to send traffic to different machines behind it. The network security subsystem 751 may use the same approach to distribute packets to different PPUs. Using connection-based policy is important because it is possible that there is one VM generating most of the traffic and consuming most of the bandwidth. The only way to distribute traffic from a single VM is to use connection-based policy.

Extended actions in the rules may include the following:
1. Send packet to one PPU;
2. Send packet to a list of PPUs in round-robin order;
3. Send packet to a list of PPUs in random order; and,
4. Send packet to a list of PPUs based on connection.

The load distribution policy 753 may depend on the service that each PPU 731, 741 is running. Sometimes, the network security subsystem 751 must distribute packets based on connection. For example, if an intrusion prevention system (IPS) service is running in a PPU, a packet from the same connection must go to the same PPU; otherwise, the internal context in the PPU might be invalid or missing.

Figure 8:
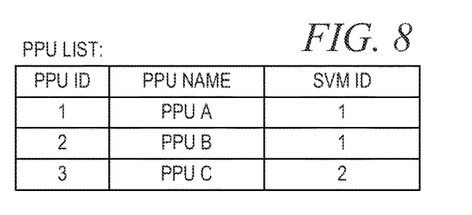
FIG. 8 depicts an example packet processing unit list in accordance with an illustrative embodiment.
Figure 9:
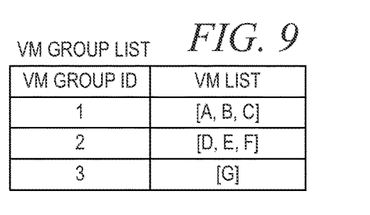
FIG. 9 depicts an example virtual machine group list in accordance with the illustrative embodiment.

FIG. 8 depicts an example packet processing unit list in accordance with an illustrative embodiment. FIG. 9 depicts an example virtual machine group list in accordance with the illustrative embodiment. In these examples, there are two SVMs running on the VMM; the first SVM has two PPUs, and the second SVM has one PPU. There are three VMs (A, B, C) in the first VM group, three VMs (D, E, F) in the second VM group, and one VM (G) in the third VM group.

Figure 10A:
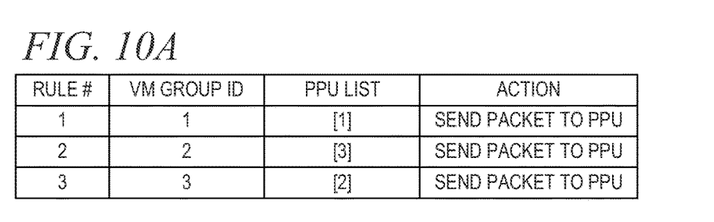
FIGS. 10A-10C illustrate example sets of rules in accordance with an illustrative embodiment.
Figure 10B:
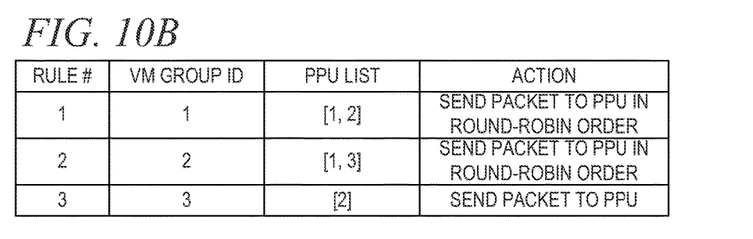
Figure 10C:
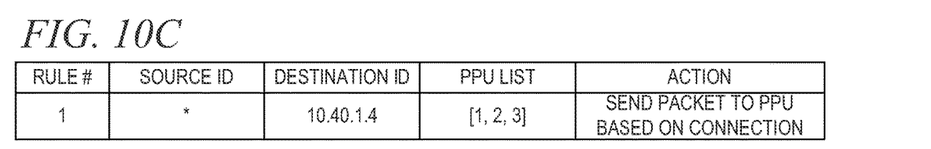

FIGS. 10A-10C illustrate example sets of rules in accordance with an illustrative embodiment. More particularly, FIG. 10A illustrates rules in which traffic to or from a VM group will be sent to different PPUs. FIG. 10B illustrates rules in which traffic to/from the same VM group will be sent to PPUs in a PPU list in round-robin order. FIG. 10C illustrates a rule in which traffic sent to a particular destination IP address will be sent to PPUs in a PPU list based on the connection. As described above, connection-based distribution is similar to round-robin, but packets in the same connection are only sent to the same PPU.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 11:
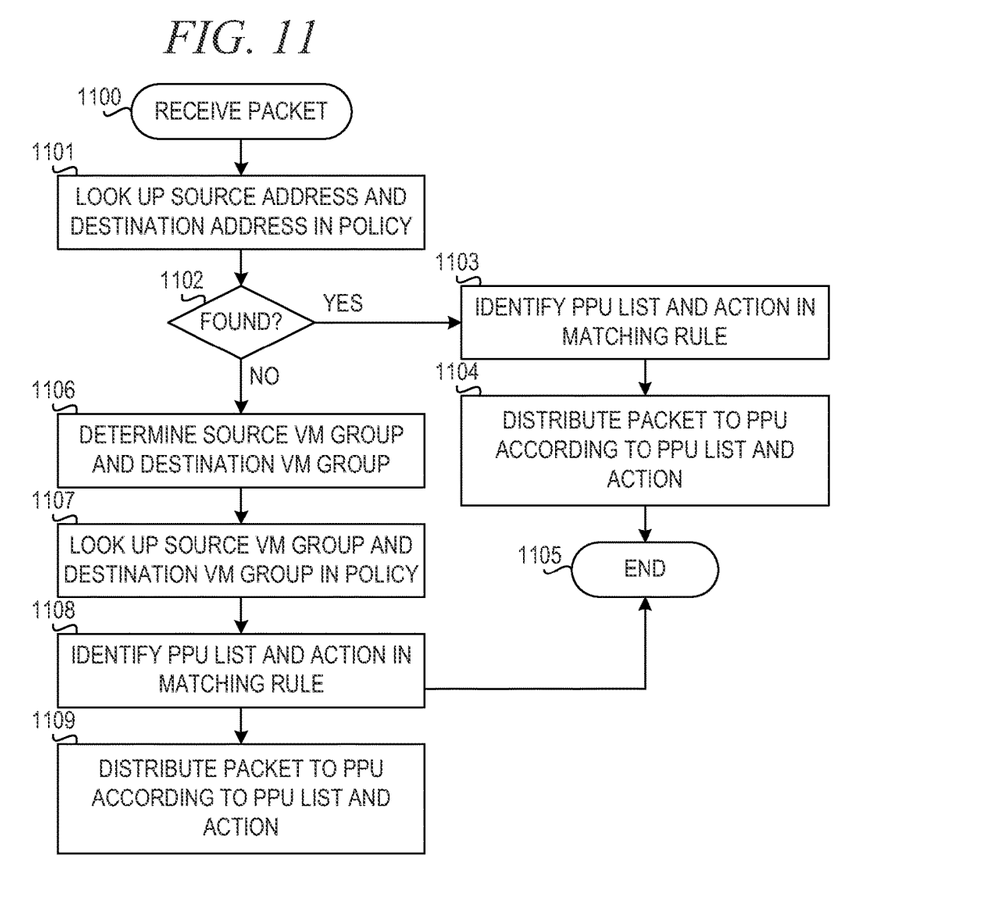
FIG. 11 is a flowchart illustrating operation of a mechanism for policy-based load distribution among host-based packet processing units in accordance with an illustrative embodiment.

FIG. 11 is a flowchart illustrating operation of a mechanism for policy-based load distribution among host-based packet processing units in accordance with an illustrative embodiment. Operation begins with receiving a packet (block 1100), and the mechanism looks up the source address and destination address in the policy rules (block 1101). The mechanism determines whether the source address or the destination address is found in the policy rules (block 1102). If the source address or the destination address is found, or alternatively the packet attributes match a policy rule, the mechanism identifies the PPU list and action in the matching rule (block 1103). Using source/destination IP address is just one embodiment. In an alternative embodiment, the mechanism may look up policy using any packet attributes. The mechanism then distributes the packet to the PPU according to the PPU list and the action (block 1104). Thereafter, operation ends (block 1105).

If the source address and the destination address are not found in the policy rules in block 1102, or alternatively the packet attributes are not found in a policy rule, the mechanism determines the source VM group and the destination VM group based on the VM group list (block 1106) and looks up the source VM group and the destination VM group in the policy rules (block 1107). The mechanism identifies the PPU list and action in the matching rule (block 1108). The mechanism then distributes the packet to the PPU according to the PPU list and the action (block 1109). Thereafter, operation ends.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments provide mechanisms for policy based load distribution between host-based packet processing units on the virtual machine monitor. The illustrative embodiments perform load distribution using a rule-based architecture. The illustrative embodiments extend the current action set of the policy rules to include the load distribution knowledge to let the virtual machine monitor (VMM), which then distributes packets to different packet processing units (PPUs). In the illustrative embodiments, no additional resources are spent on load distribution logic in the SVM. Those resources can now focus on the packet processing task. The illustrative embodiments require less overhead to send packets to different PPUs in different SVMs. The illustrative embodiments require no cross-VM communication. The illustrative embodiments allow the maximum throughput on systems with multiple-core processors.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor and configure the processor to implement a network security subsystem and a packet inspection interface in a virtual machine monitor executing in the data processing system, for policy based load distribution among a plurality of packet processing units, the method comprising:

responsive to the network security subsystem in the virtual machine monitor receiving a packet from a virtual machine, comparing, by the network security subsystem, the packet to rules in a load distribution policy in the network security subsystem, wherein each rule comprises a packet processing unit list and an action;

responsive to the packet matching a rule in the load distribution policy, identifying, by the network security subsystem, a packet processing unit list and an action in the matching rule, wherein the identified packet processing unit list identifies a plurality of packet processing units executing in one or more security virtual machines in the data processing system, wherein the identified action comprises an extended action for selecting a packet processing unit from among the identified packet processing unit list, and wherein the extended action is selected from the group consisting of: selecting the packet processing unit in round-robin order and selecting the packet processing unit in random order;

selecting the packet processing unit from the plurality of packet processing units based on the identified action; and distributing, by the packet inspection interface, the packet to the selected packet processing unit.

2. The method of claim 1, wherein comparing the packet to the rules in the load distribution policy comprises comparing a source address or a destination address of the packet to the rules in the load distribution policy.

3. The method of claim 1, wherein comparing the packet to the rules in the load distribution policy comprises:
identifying a virtual machine associated with the packet;
determining a virtual machine group associated with the identified virtual machine; and
comparing the virtual machine group to the rules in the load distribution policy.

4. The method of claim 3, wherein determining the virtual machine group associated with the identified virtual machine comprises looking up the identified virtual machine in a virtual machine group list data structure.

5. The method of claim 1, wherein the plurality of packet processing units execute within a plurality of security virtual machines.

6. The method of claim 1, wherein the selected packet processing unit executes within a given security virtual machine and wherein the packet is distributed to the selected packet processing unit via the packet inspection interface executing in the virtual machine monitor and a packet inspection application programming interface in the given security virtual machine.

7. A computer program product comprising a computer readable storage medium having a computer readable program stored therein, wherein the computer readable program, when executed on at least one processor of a data processing system, causes the data processing system to implement a network security subsystem and a packet inspection interface in a virtual machine monitor executing in the data processing system, for policy based load distribution among a plurality of packet processing units, wherein the computer readable program causes the data processing system to:
responsive to the network security subsystem in the virtual machine monitor receiving a packet from a virtual machine, compare, by the network security subsystem, the packet to rules in a load distribution policy in the network security subsystem, wherein each rule comprises a packet processing unit list and an action;
responsive to the packet matching a rule in the load distribution policy, identify a packet processing unit list and an action in the matching rule, wherein the identified packet processing unit list identifies a plurality of packet processing units executing in one or more security virtual machines in the data processing system, wherein the identified action comprises an extended action for selecting a packet processing unit from among the identified packet processing unit list, and wherein the extended action is selected from the group consisting of: selecting the packet processing unit in round-robin order and selecting the packet processing unit in random order;
select the packet processing unit from the plurality of packet processing units based on the identified action; and
distribute, by the packet inspection interface, the packet to selected packet processing unit.

8. The computer program product of claim 7, wherein comparing the packet to the rules in the load distribution policy comprises comparing a source address or a destination address of the packet to the rules in the load distribution policy.

9. The computer program product of claim 7, wherein comparing the packet to the rules in the load distribution policy comprises:
identifying a virtual machine associated with the packet;
determining a virtual machine group associated with the identified virtual machine; and
comparing the virtual machine group to the rules in the load distribution policy.

10. The computer program product of claim 9, wherein determining the virtual machine group associated with the identified virtual machine comprises looking up the identified virtual machine in a virtual machine group list data structure.

11. The computer program product of claim 7, wherein the plurality of packet processing units execute within a plurality of security virtual machines.

12. An apparatus comprising:
at least one processor; and
at least one memory coupled to the at least one processor, wherein the at least one memory comprises instructions which, when executed by the at least one processor, cause the at least one processor to implement a network security subsystem and a packet inspection interface in a virtual machine monitor executing on the at least one processor, for policy based load distribution among a plurality of packet processing units, wherein the instructions cause the at least one processor to:
responsive to the network security subsystem in the virtual machine monitor receiving a packet from a virtual machine, compare, by the network security subsystem, the packet to rules in a load distribution policy in the network security subsystem, wherein each rule comprises a packet processing unit list and an action;
responsive to the packet matching a rule in the load distribution policy, identify, by the network security subsystem, a packet processing unit list and an action in the matching rule, wherein the identified packet processing unit list identifies a plurality of packet processing units executing in one or more security virtual machines in the data processing system, wherein the identified action comprises an extended action for selecting a packet processing unit from among the identified packet processing unit list, and wherein the extended action is selected from the group consisting of: selecting the packet processing unit in round-robin order and selecting the packet processing unit in random order;
select the packet processing unit from the plurality of packet processing units based on the identified action; and
distribute, by the packet inspection interface the packet to the selected packet processing unit.

13. The computer program product of claim 7, wherein the selected packet processing unit executes within a given security virtual machine and wherein the packet is distributed to the selected packet processing unit via the packet inspection interface executing in the virtual machine monitor and a packet inspection application programming interface in the given security virtual machine.

14. The apparatus of claim 12, wherein the selected packet processing unit executes within a given security virtual machine and wherein the packet is distributed to the selected packet processing unit via the packet inspection interface executing in the virtual machine monitor and a packet inspection application programming interface in the given security virtual machine.

\* \* \* \* \*